United States Patent [19]

Belanger, Jr.

[11] Patent Number: 4,721,453

[45] Date of Patent: Jan. 26, 1988

[54] APPARATUS FOR ENCAPSULATING SEMICONDUCTORS

[75] Inventor: Thomas D. Belanger, Jr., Clarendon Hills, Ill.

[73] Assignee: GTE Communication Systems Corporation, Phoenix, Ariz.

[21] Appl. No.: 836,654

[22] Filed: Mar. 5, 1986

[51] Int. Cl.⁴ ...................... B29C 39/02; B29C 39/26; B29C 39/38

[52] U.S. Cl. ........................................ 425/94; 53/140; 118/415; 425/101; 425/122; 425/383; 425/394; 425/397; 425/347

[58] Field of Search ................ 425/100, 101, 103, 122, 425/126 R, 256, 362, 405, 129 R, 402, 403, 394, 383, 397, 347, 348, 90, 94; 264/272.11, 272.14, 272.15, 272.17; 118/415; 53/140 X, 122

[56] References Cited

U.S. PATENT DOCUMENTS

| | | | |
|---|---|---|---|
| 3,659,821 | 5/1972 | Sakamoto et al. | 425/129 R |
| 3,693,252 | 9/1972 | Robertson et al. | 264/272.17 |
| 4,374,080 | 2/1983 | Schroeder | 264/272.17 |
| 4,443,173 | 4/1984 | Mansberger | 425/126 R |
| 4,451,973 | 6/1984 | Tateno et al. | 264/272.17 |
| 4,540,533 | 9/1985 | Sahakian | 264/272.14 |
| 4,563,320 | 1/1986 | Morgan | 264/322 |

Primary Examiner—Willard E. Hoag
Attorney, Agent, or Firm—Robert J. Black; Gregory G. Hendricks

[57] ABSTRACT

A semiconductor encapsulating apparatus including a positioning apparatus positioning an encapsulant premold (preformed piece or pellet) in contact with the semiconductor and the curing apparatus through which the semiconductor and encapsulant are passed to cure and thereby encapsulate the semiconductor. The encapsulating apparatus may include a vacuum chamber to degass the encapsulant prior to curing, a robotic arm to position an encapsulant premold in contact with the semiconductor and encapsulant premold forming apparatus including a die engaging a plastically deformable strip to form therein a mold. Also included may be a mold filling dispenser, a mold solidifying bath which may include liquid nitrogen, a solidified premold ejecting roller and a premold storage tray. Also disclosed are roller and spray coating apparatuses adapted to coat an inner surface of the mold with a release agent thereby to promote subsequent premold release.

18 Claims, 3 Drawing Figures

APPARATUS FOR ENCAPSULATING SEMICONDUCTORS

CROSS-REFERENCES TO RELATED APPLICATIONS

A related, commonly assigned, co-pending application is entitled "A Method of Forming Premolds For Use in Encapsulating Semiconductors", Serial No. 06/836,653 filed concurrently herewith and invented by the same inventor.

BACKGROUND OF THE INVENTION (1) Field Of The Invention

The present invention relates to encapsulating semiconductors and more particularly, to a method of encapsulating semiconductors utilizing an encapsulant matrix hereinafter referred to as a premold, prepared prior to encapsulating a semiconductor and subsequently utilized to achieve semiconductor encapsulation.

(2) Background Art

Semiconductor encapsulation apparatus is very well known to those skilled in the art. In this regard an encapsulation system is known to be marketed by Mesa Technology, Mountain View, California under the trademark "Mesa-Pack". This encapsulation system is arranged to accept semiconductors which have been previously bonded to beam leads attached to a strip of polyimide film, the semiconductor and film strip assembly looking much like photo film with the semiconductor and beam leads located where the picture frames would normally be located. The "Mesa-Pack" system is described in an article entitled "Encapsulated Chip Package on Tape" published in the Aug. 1985 issue of Semiconductor International magazine and is arranged to dispense fluid encapsulant directly onto the semiconductor substrate in either a dot, line or drawn pattern. After dispensing of the encapsulant onto the semiconductor, the encapsulant is cured to form a protective cover over the semiconductor substrate and beam lead bonding sites thereby protecting the semiconductor and bonds from environmental effects.

Another semiconductor encapsulation machine is known to be manufactured by International Micro Industries Incorporated, Cherry Hill, New Jersey and designated model #EM-1166. The EM-1166 encapsulation machine is also arranged to accept semiconductors in the photo film format and to dispense on the semiconductor via dispensing needles a liquid encapsulant. Following dispensing, the encapsulant is prejelled via a heated nitrogen gun and subsequently cured in an infrared oven.

The above encapsulation systems, while representative of the art, are seen to teach methods of encapsulating semiconductors not employing the method of the subject invention.

SUMMARY OF THE INVENTION

The present invention provides an apparatus for encapsulating semiconductors utilizing an encapsulant premold placed on the semiconductor die and subsequently cured. The semiconductor may be heated prior to placement of the premold thereon to remove moisture. Following premold placement, the resulting assembly is subsequently degassed in a vacuum chamber to ensure that trapped gas bubbles in the semiconductor-encapsulant interface are removed.

The encapsulant premold may be formed by impressing in a plastically deformable material, an encapsulant mold. The mold is then filled with encapsulant and the mold and encapsulant then cooled to solidify the encapsulant forming an encapsulant premold. Following solidification, the solidified encapsulant premold is ejected from the mold by applying a force to the bottom of the mold in a direction towards an upper edge of the mold to flatten the mold walls thereby ejecting the encapsulant premold. The ejected premold may be received in a storage tray and stored for later use in encapsulating semicondutors.

A release agent dispenser may be included in the apparatus to apply release agent either prior to or subsequent to forming of the mold and will serve to facilitate removal of the solidified premold later. Heaters may be applied to the mold prior to, during or following filling of the mold with encapsulant, to enhance filling of the mold. Additionally, heating of the mold subsequent to filling may be advantageously applied to project an outerskin of the encapsulant premold immediately adjacent to the mold to enhance definition of the cured preform when later applied to a semiconductor die.

A liquid nitrogen bath is included in the apparatus to cool and thereby solidify the encapsulant forming the encapsulant premold. Finally, a robotic arm may be included and utilized to position an encapsulant premold in contact with the semiconductor die.

BRIEF DESCRIPTION OF THE DRAWING

An understanding of the present invention will be apparent from the following description taken in conjunction with the accompanying drawing in which.

DESCRIPTION OF THE PREFERRED EMBODIMENT

Figure 1:
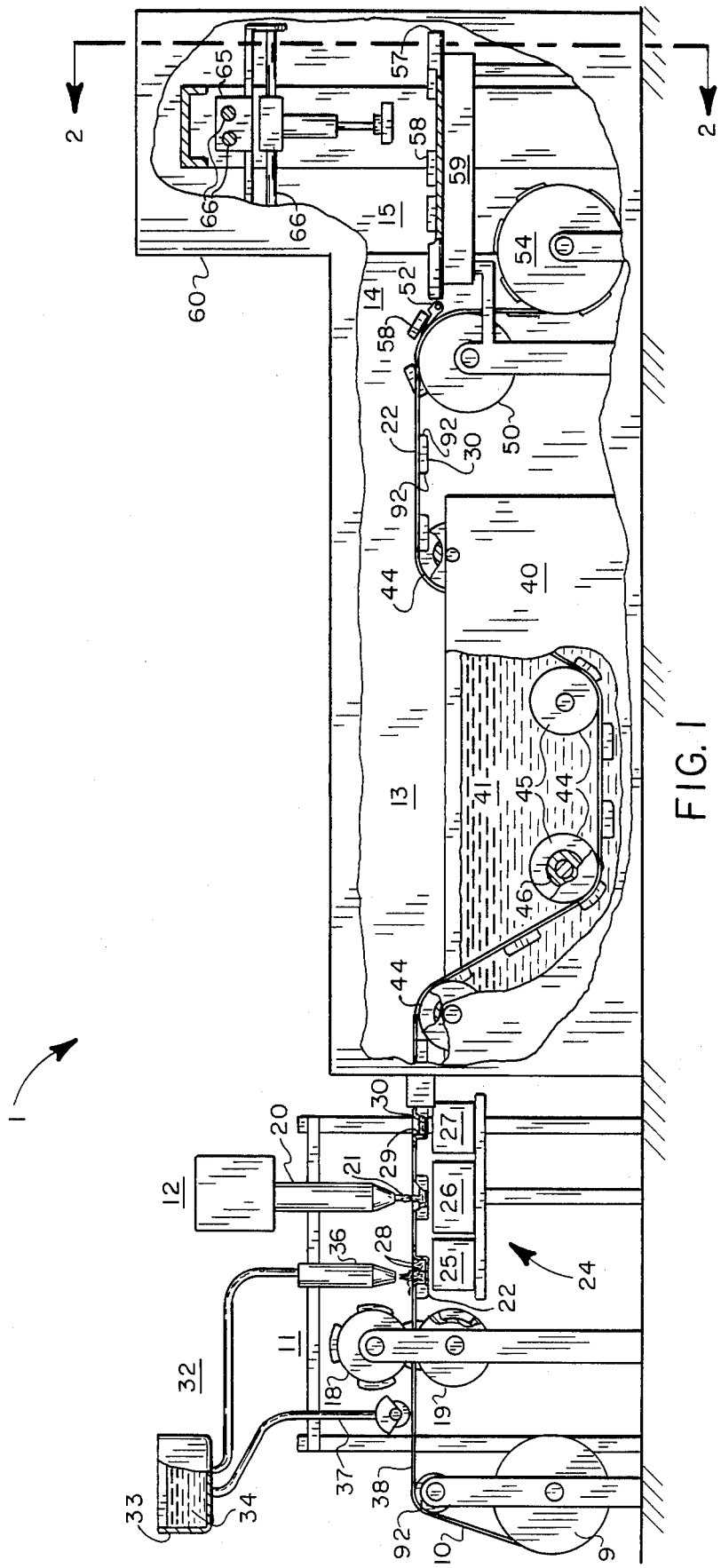
FIG. 1 is a side elevation of the encapsulant premold forming portion of the present invention.
Figure 2:
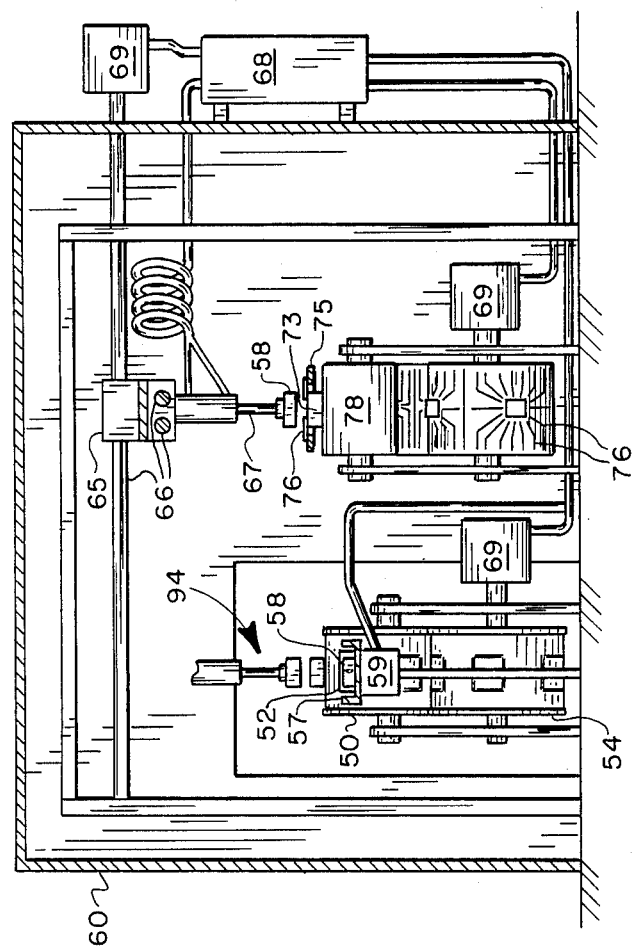
FIG. 2 is a sectional view along the line 2—2 in FIGS. 1 and 3 depicting the premold positioning apparatus of the present invention.
Figure 3:
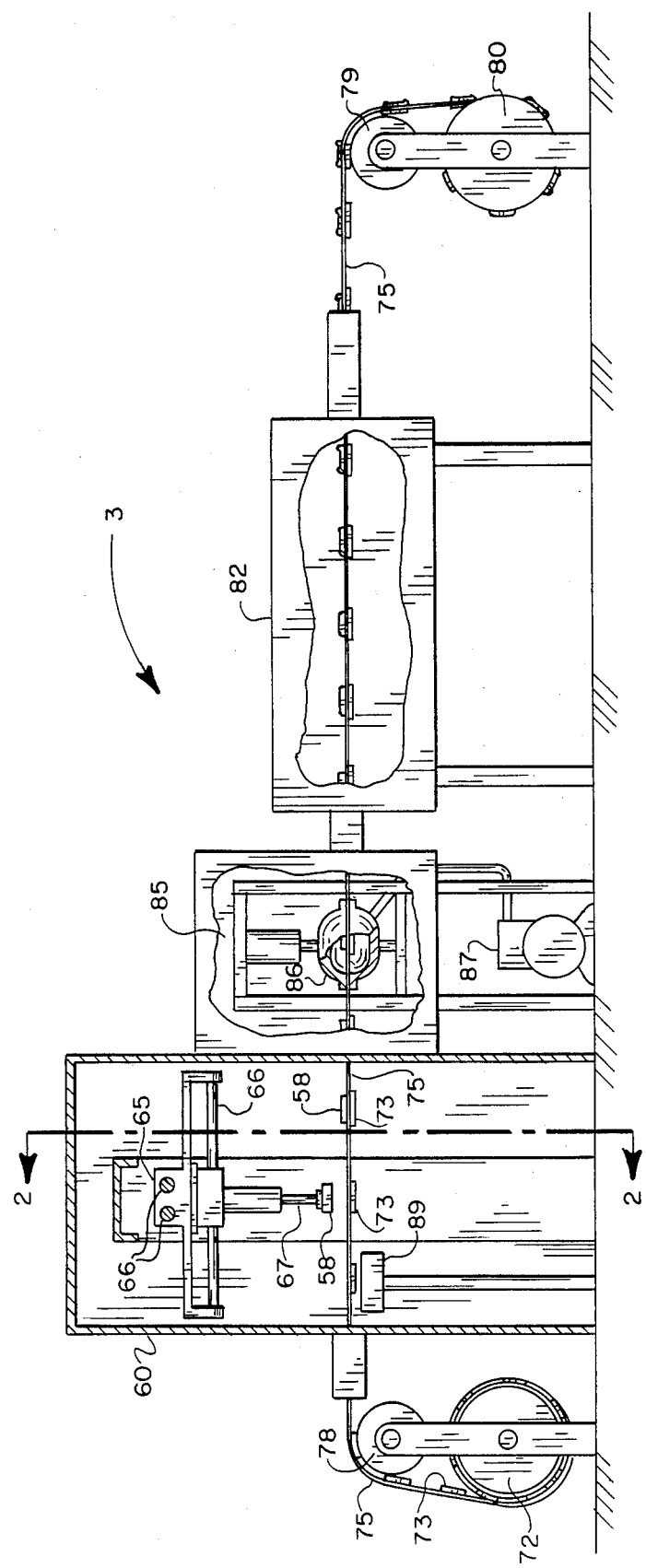
FIG. 3 is a side elevational view of the encapsulant curing portion of the subject invention.

Referring now to the figures, there is shown in the FIG. 1 an encapsulant premold forming apparatus 1, in the FIG. 2 an encapsulant premold positioning apparatus 2, and in FIG. 3 an encapsulant premold curing apparatus 3.

Referring now to FIG. 1 there is shown a supply roll 9 of plastically deformable material 10. The plastically deformable material may be of plastic composition or in the alternate, may consist of a metallic foil, for example, aluminum foil. Also included in the premold forming apparatus 1 is a mold forming apparatus 11, a mold filling apparatus 12, a mold cooling apparatus 13, a premold releasing apparatus 14, and a premold storage apparatus 15.

The mold forming apparatus 11 includes a circular punch wheel 18 in merging engagement with a circular die wheel 19. Although a circular punch and die is shown, it will be readily apparent to those skilled in the art that other forms of mold forming apparatus may be equally effectively employed in the present invention, such as the use of a linearly traveling punch engaging a die.

The mold filling apparatus 12 includes an encapsulant dispenser 20 positioned to dispense a fluid encapsulant 21 into a plurality of formed molds 22. The mold filling apparatus 12 may optionally include a mold warming rail 24 which may include a first section 25 arranged to warm the encapsulant molds 22 prior to filling, a second section 26 positioned to warm the molds 22 during filling and a third section 27 positioned to warm the molds 22 following filling. The third section 27 may be additionally arranged to heat the molds 22 thereby to form a thin layer of precured encapsulant adjacent an inner surface 28 of the walls 29 and bottom 30 of the mold 22 thereby to increase form definition of the encapsulant premold when later cured as described below.

The mold filling apparatus 12 may additionally include a release agent application apparatus 32 including a reservoir 33 including a release agent 34 connected to a release agent applicator. In this regard, the release agent applicator may be in the form of a sprayer 36 positioned between the mold forming apparatus 11 and the encapsulant dispenser 20 or in the form of a roll dispenser 37 positioned between the roll of plastically deformable material 9 and the mold forming apparatus 11. Alternately, both the roll dispenser 37 and the sprayer 36 may be provided. In the event the roll dispenser 37 is provided, either alone or in combination with the sprayer 36, the release agent 34 may be formulated as a single compound serving to coat an upper surface 38 of the deformable material 10 prior to forming of the mold 22 thereby to enhance and ease mold forming in the mold forming apparatus 11. In this regard, the release agent 34 may include silicone fluid. In the alternative, the release agent 34 may be formulated to contain a sheet lubricant as is used in the punch forming of materials and a parting agent as is used in the epoxy casting art. In this regard the release agent 34 may include a silicone fluid, blended with a die drawing lubricating oil.

The mold cooling apparatus 13 includes a tank 40 containing a cooling fluid 41. The cooling fluid 41 may be any type which may be brought into contact with the deformable material 10 and the encapsulant 34 without reacting. In this regard, liquid nitrogen may be used as the cooling fluid 41. The mold cooling apparatus 13 additionally includes a plurality of strip guide rollers, 44 each including a pair of flanges 45 engaging a corresponding lateral edge of the strip 10 and including a center section 46 of reduced diameter. The center section 46 is provided between the flanges 44 to provide clearance for the molds 22 as they pass over the guide rollers 44 and to prevent contact with the encapsulant 36.

The premold releasing apparatus 14 includes a mold flattening roller 50 engaging the bottom 30 of the mold 22 and a mold strip take-up reel 54. This premold releasing apparatus 14 may additionally include a premold inverter 52.

The premold storage apparatus 15 includes a slotted tray 57 positioned to receive the solidified encapsulant premolds 58 and a cooler 59 positioned to cool the premold receiving tray 57 thereby to retain the premolds 58 in a solidified state until required. The cooler 59 maybe of any form known to those skilled in the art, for example a thermoelectric cooling plate maybe used.

The mold cooling apparatus 13, premold releasing apparatus 14 and premold storage apparatus 15 maybe included in an atmosphere shielding enclosure 60.

Referring now to FIG. 2, the encapsulant premold positioning apparatus 2 may include a robotic arm 65 including an encapsulant preform pick up finger 67. The apparatus of the present invention may be controlled by a logic control 68 and a plurality of drive mechanisms generally indicated at 69.

Referring now to FIG. 3 there is shown the premold curing apparatus 3 of the present invention including a supply spool 72 containing a plurality of semiconductors 73 attached to a carrier strip 75 in a predetermined format. In this regard, the strip 75 may be in the format of photo film including a plurality of bonding beam leads 76 formed on a surface thereof, the beam leads 76 attached or bonded to the semiconductors 73. The supply spool 72 may be positioned outside of the enclosure 60 as shown or, in the alternate, may be included within in the enclosure 60 without departing from the spirit of the invention.

A supply guide roller 78 is included to guide the carrier strip 75 from the supply spool 72 into the enclosure 60 of the present invention. A take-up guide roller 79 is also provided to receive the carrier strip 75 as it emerges from the enclosure 60 and guide it onto a take-up spool 80.

The encapsulant premold curing apparatus 3 may include an encapsulant curing oven 82 and a degassing apparatus 85 including a vacuum chamber 86 connected to a source vacuum 87. Finally, the encapsulant premold curing apparatus 3 may additionally include a moisture removing apparatus 89 which may be in the form of a heating element.

Referring again to FIG. 1, the semiconductor encapsulating apparatus of the present invention may be operated by feeding the mold strip 10 from the roll of material 9 over a guide roller 92, below the optionally provided die lubricant applicator 37 and into the mold forming apparatus 11 where it will pass between the punch wheel 18 and die wheel 19. Upon passage through the mold forming apparatus 11, the mold 22 will be formed including the mold bottom 30, the side walls 29 depressed below the surface 38 of the material 10. Upon emerging from the mold forming apparatus 11, the mold strip 10 will pass beneath the release ageant applicator 37 whereat a predetermined quality of the release agent 34 will be spray dispensed onto the inner surface 28 of the mold 22. Simultaneously, the mold 22 may be warmed via the first section 25 of the mold warming rail 24 to prepare the mold to accept the fluid encapsulant 21. The mold 22 will then pass beneath the encapsulant dispenser 20 whereat it will be filled with the fluid encapsulant 21 and simultaneously may be warmed via the second section 26 of the mold warming rail 24. Warming of the mold prior to and during filling with encapsulant may be advantageously performed for the purpose of decreasing, temporarily, the viscosity of the encapsulant 21 thereby to promote uniform filling of the mold with encapsulant. Following filling of the mold, the third section 27 of the mold warming rail 24 may additionally heat the mold to prejell and partially cure a thin layer of fluid encapsulant immediately adjacent the inner surface 28 of the mold 22.

The filled and precured mold will then pass over the guide roller 44 and into a mold cooling apparatus 13 whereat it will be immersed in a tank 40 of a cooling fluid such as the liquid nitrogen 41. Immersion in the bath of the liquid nitrogen 41 will serve to cool and thereby solidify the encapsulant forming the encapsulant premold 58. The solidified encapsulant and mold 22 will then emerge from the mold cooling apparatus 13 and engage the mold flattening roller 50 of the premold releasing apparatus 14 whereat the mold bottom 30 will be forced toward the mold strip 10 collapsing the mold walls 29 of the mold 22 and ejecting the solidified encapsulant preform 58 therefrom. The encapsulant premold 58 will travel along the flattened mold 22 to a point where it will be received in the premold inverter 52 from where it will be inverted and placed in the slotted tray 57 of the premold storage apparatus 15. The premold 58 will reside in such storage apparatus until required for use in encapsulating a semiconductor. Following the ejecting of the solidified preform 58, the mold strip 10 will be received and stored on the take-up reel 54.

The robotic arm 65 may include linear movement rails 66 positioned at right angles to each other and used to reposition the stored premolds 58 within the storage apparatus 15 thereby to optimally store the premolds. The premold inverter 52 may be operated upon receipt of a solidified preform 58 therein by rotating such inverter clockwise thereby inverting the premold 58 and placing the premold in the storage apparatus 15.

Referring now to FIG. 2 and FIG. 3, operation of the encapsulant positioning and curing apparatus includes feeding the tape 75 including the bonded semiconductors 73 over the supply guide roller 78 and into the enclosure 60. Upon entering the enclosure 60, the tape 75 will pass over the moisture removing heating element 89 to warm the tape and semiconductors and thereby to evaporate any condensed and/or absorbed moisture therefrom. Following the evaporation of moisture from the semiconductors semiconductor, the 73 will each pass below the robotic arm 65 at which position the pick-up finger 67 will pick-up a selected one of the stored encapsulant premolds 58 (shown in FIG. 2 at reference numeral 94), reposition the selected encapsulant premold 58 over the semiconductor 73 and place it in contact with the die. Upon contact with the semiconductor 73 and beam leads 76, the encapsulant will absorb heat from the last two mentioned elements, becoming semiliquid or viscid, flowing into intimate contact with those elements.

Following placement of the encapsulant premold 58 on the semiconductor 73, the two elements will enter the degassing apparatus 85 whereat they will pass between the opposing halves of the vacuum chamber 86. The vacuum chamber 86 will close and seal about the semiconductor 73 and tape 75 and a vacuum will be drawn within the chamber 86 by vacuum source 87. Such operation will serve to draw gas bubbles trapped in the interface between the encapsulant premold 58 and the semiconductor 73 to the surface and expel them thereby insuring intimate contact of the encapsulant with the semiconductor. The degassed semiconductor and encapsulant will then pass into and through the curing oven 82 where the encapsulant will be cured to form a solidified hermetic seal against the semiconductor 73. Finally, the encapsulated semiconductor and tape will be passed over the guide roller 79 and onto the take-up spool 80.

Although the preferred embodiment of the present invention has been illustrated and the form described in detail, it will be readily apparent to those skilled in the art that various modifications may be made therein without departing from the spirit of the invention or from the scope of the appended claims.

What is claimed is:

1. An apparatus for encapsulating a semi-conductor, comprising: premolded encapsulant positioning means for placing an premolded encapsulant in contact with a semiconductor and means for receiving the encapsulant and semiconductor to liquify and cure the encapsulant, encapsulating the semiconductor, means for moving a semiconductor to the encapsulant positioning means and to said means for curing, means for forming the premolded encapsulant and storage means for the encapsulant, said positioning means being located to withdraw the premolded encapsulant from said storage when placing the encapsulant on the semiconductor.

2. An apparatus as claimed in claim 1 wherein; said premolded encapsulant premold forming apparatus includes mold forming apparatus, mold filling apparatus, mold cooling apparatus, and premolded encapsulant releasing apparatus, said mold forming apparatus operated to accept a strip of mold material and to form therein an encapsulant mold, said mold filling apparatus operated to fill said mold with encapsulant in fluid form, said mold cooling apparatus operated to accept said filled mold and cool same to solidify said encapsulant, and said premolded encapsulant releasing apparatus being operable to release said solidified encapsulant from said mold and to deposit said encapsulant into said storage means.

3. An apparatus as claimed in claim 2 wherein; said mold forming apparatus includes a circular punch wheel in meshing engagement with a circular die wheel, said mold material fed between said punch wheel and said die wheel to form therein at least one encapsulant mold.

4. An apparatus as claimed in claim 2 wherein; said mold filling apparatus includes a preheat warming rail and an encapsulant dispensing apparatus, said preheat warming rail operated to warm said encapsulant mold thereby to encourage uniform filling of said mold with encapsulant dispensed by said encapsulant dispensing apparatus and said encapsulant dispensing apparatus operated to dispense said encapsulant in said fluid form into said encapsulant mold.

5. An apparatus as claimed in claim 2 wherein; said premold releasing apparatus includes a mold flattening wheel and a take-up spool, said mold flattening wheel engaging a bottom of said encapsulant mold and exerting a force thereon toward said mold material strip to urge said bottom toward said strip thereby to flatten said mold and to eject said encapsulant, and said take-up spool operated to accept and retain said film following flattening therein of said mold.

6. An apparatus as claimed in claim 2 wherein; said semiconductor encapsulating apparatus further includes a release agent application apparatus, said release agent application apparatus operated prior to filling of said mold with encapsulant to apply a release agent thereby to enhance later removal of said solidified encapsulant.

7. An apparatus as claimed in claim 6 wherein; said release agent application apparatus includes a spray nozzle dispensing a silicone fluid.

8. An apparatus as claimed claim 2 wherein; said mold cooling apparatus includes a bath of liquid nitrogen.

9. An apparatus as claimed in claim 2 wherein; said storage means includes a slotted tray.

10. An apparatus as claimed in claim 1 wherein; said positioning apparatus includes a robotic arm.

11. An apparatus as claimed in claim 1 wherein; said curing apparatus includes a thermal oven.

12. An apparatus as claimed in claim 9 wherein: said slotted tray includes cooling means to maintain said premolded encapsulant in a solidified state.

13. An apparatus as claimed in claim 6 wherein: said release agent application apparatus is positioned between said mold forming apparatus and said mold filling apparatus.

14. An apparatus as claimed in claim 6 wherein: said release agent application apparatus is positioned before said mold forming apparatus.

15. An apparatus as claimed in claim 1 wherein: said encapsulating apparatus includes a moisture removing apparatus positioned to engage said semiconductor prior to encapsulation and operated to remove moisture from said semiconductor.

16. An apparatus as claimed in claim 1 wherein said encapsulating apparatus includes an encapsulant degassing apparatus positioned to engage said semiconductor following placement of said encapsulant premold thereon and prior to curing of said premold, said degassing apparatus operated to remove gasses trapped between said semiconductor and said encapsulant premold.

17. Apparatus as claimed in claim 2 wherein said premolded encapsulant forming apparatus includes encapsulant inverting apparatus, the inverting apparatus being operable to accept solidified premolded encapsulant from the encapsulant releasing apparatus, to invert the premold and deposit the premolded encapsulant in said storage means.

18. An apparatus as claimed in claim 2 wherein: said positioning means includes movement means adapted to permit said positioning means to reposition said premolds within said storage means.

* * * * *